(12) United States Patent
Heath (10) Patent No.: US 6,953,174 B2
(45) Date of Patent: Oct. 11, 2005

(54) SWAY BRACE FITTING

(75) Inventor: Richard W. Heath, Yorba Linda, CA (US)

(73) Assignee: Tolco Incorporated, Corona, CA (US)

( * ) Notice: Subject to any disclaimer, the term of this patent is extended or adjusted under 35 U.S.C. 154(b) by 251 days.

(21) Appl. No.: 10/287,323

(22) Filed: Nov. 1, 2002

(65) Prior Publication Data

US 2003/0052235 A1 Mar. 20, 2003

Related U.S. Application Data (62) Division of application No. 09/929,602, filed on Aug. 14, 2001, now Pat. No. 6,517,030, which is a continuation of application No. 09/301,299, filed on Apr. 28, 1999, now Pat. No. 6,273,372.

(51) Int. Cl.$^7$ .................................................. F16L 3/02
(52) U.S. Cl. ........................ 248/62; 248/317; 403/362
(58) Field of Search ............................ 248/49, 58, 62, 248/63, 65, 82, 84, 86, 88, 220.22, 222.14, 222.13, 229.1, 291.1, 317; 403/362, 363; 24/486; 15/250.32; 269/249; 439/803

(56) References Cited

U.S. PATENT DOCUMENTS

| | | |
|---|---|---|
| 98,656 A | 1/1870 | Adt .............................. 269/180 |
| 429,057 A | 5/1890 | Peterson ........................ 248/62 |
| 854,209 A | 5/1907 | Goss |
| 1,050,235 A | 1/1913 | Scanlan |
| 1,235,999 A | 8/1917 | Neeley ............... 254/134.3 PA |
| 1,237,525 A | 8/1917 | Keator |
| 1,369,747 A | 2/1921 | Jordan |
| 1,394,988 A | 10/1921 | Folberth |
| 1,672,476 A | 6/1928 | Tipsord et al. .............. 174/5 R |
| 1,794,976 A | 3/1931 | Mueller ....................... 439/803 |
| 1,888,265 A | 11/1932 | Guthrie |
| 2,111,357 A | 3/1938 | Cornell, Jr. .................. 248/59 |
| 2,375,513 A | 5/1945 | Bach |
| 2,470,991 A | 5/1949 | Kindorf et al. |
| 2,632,217 A | 3/1953 | Flora ........................ 24/16 PB |
| 2,642,243 A | 6/1953 | Kindorf |
| 2,675,201 A | 4/1954 | Friel |
| 2,699,190 A | 1/1955 | Packer ........................ 403/363 |
| 2,699,601 A | 1/1955 | Darnell ........................ 269/40 |

(Continued)

FOREIGN PATENT DOCUMENTS

| | | |
|---|---|---|
| DE | 3511335 A1 | 10/1986 |
| FR | 1559084 | 3/1969 |
| FR | 2 367 216 A1 | 5/1978 |
| GB | 2 003 222 A | 3/1979 |
| JP | 10122437 | 5/1998 |

OTHER PUBLICATIONS

Tolco Incorporated product manual, pp. 128–131, entitled Fig. 906–Sway Brace Multi–Fastener Adaptor, Fig. 907–4—Way Longitudinal Sway Brace Attachment, Fig. 908–No–Thread Straight Sway Brace Attachment and Fig. 909–No–Thread Swivel Sway Brace Attachment.

Tolco Incorporated product manual, p. 21, entitled Tolstrut–Angle Fittings (Seismic Components).

(Continued)

*Primary Examiner*—Anita King
*Assistant Examiner*—Jon Szumny
(74) *Attorney, Agent, or Firm*—Knobbe, Martens Olson & Bear, LLP (57) ABSTRACT

A versatile sway brace fitting, includes a pair of spaced jaws, for firmly and deformingly gripping a brace, and a method for manufacturing the fitting. The fitting can withstand substantial loads and is adaptable to receive a variety of braces such as bracing pipes, angle irons, channels, plates, among others. The fitting includes a set screw, preferably angled, and a sharp-cornered recess which assist in resisting withdrawal of the brace from the jaws. The method of manufacturing is desirably simple and expeditious, thereby ensuring that the fitting is inexpensive.

17 Claims, 6 Drawing Sheets

U.S. PATENT DOCUMENTS

| | | | |
|---|---|---|---|
| 2,868,485 A | 1/1959 | Friel | |
| 2,896,896 A | 7/1959 | Revzin | |
| 2,900,159 A | 8/1959 | Mattox | |
| 2,951,672 A | 9/1960 | Bott | 248/317 |
| 3,278,148 A | 10/1966 | Denaro | |
| 3,321,161 A | 5/1967 | Hirt | |
| 3,714,744 A | 2/1973 | Kozlarz | |
| 3,920,208 A | 11/1975 | Dowdy et al. | |
| 3,931,919 A | 1/1976 | Gerber et al. | |
| 4,270,721 A | 6/1981 | Mainor, Jr. | |
| 4,342,477 A | 8/1982 | McClure | 292/307 R |
| 4,455,011 A | 6/1984 | Levine | |
| 4,570,885 A | 2/1986 | Heath | 248/72 |
| 4,746,780 A | 5/1988 | Resh | |
| 4,850,630 A | 7/1989 | Davies | 294/103.1 |
| 5,295,646 A | 3/1994 | Roth | |
| 5,344,108 A | 9/1994 | Heath | |
| 5,462,246 A | 10/1995 | Schlenker | |
| 5,472,162 A | 12/1995 | Mason | |
| 5,662,427 A | 9/1997 | Chen | 403/362 |
| 5,785,306 A | 7/1998 | Wilson et al. | |
| 5,832,679 A | 11/1998 | Roth | 52/167.3 |
| 5,897,088 A | 4/1999 | Kirschner | |
| 5,947,424 A | 9/1999 | Heath | |

OTHER PUBLICATIONS

Tolco Incorporated product manual, entitled Fig. 800–Adjustable Sway Brace Attachment to Steel, 7/97.

Tolco Incorporated catalog, p. 44, admitted prior art.

Drawing shown in National Fire Protection Association, admitted prior art.

Tolco Incorporated Catalog, FIG. 68 Wide Throat Top Beam "C" Clamp With Locknut and FIG. 69 Beam Clamp Retaining Strap, p. 46.

Tolco Incorporated Catalog, FIG. 69R Retrofit Capable Beam Clam Retaining Strap, p. 54A.

Modern, Catalog "J", 1953, The Modern Hanger Corporation, Cleveland, Ohio.

SWAY BRACE FITTING

RELATED APPLICATION

This application is a divisional of U.S. application Ser. No. 09/929,602, filed Aug. 14, 2001 now U.S. Pat. No. 6,517,030, which is a continuation of U.S. application Ser. No. 09/301,299, filed Apr. 28, 1999, now U.S. Pat. No. 6,273,372, issued Aug. 14, 2001, the entirety of each one which is hereby incorporated by reference herein.

BACKGROUND OF THE INVENTION

1. Field of the Invention

The present invention relates to devices for bracing pipes and other loads, suspended below ceilings and beams, against sway and seismic disturbances, and, in particular, to a sway brace fitting for firmly gripping a brace.

2. Background of the Related Art

There is a multitude of products in the market utilized by building and plumbing contractors for bracing and supporting pipes, ducts, sprinkler systems, fans, air-conditioners and other loads from ceilings and beams. These products include clamps, braces, hooks, straps, plates, brackets, among other items. There are various types of braces, for example, pipes, channels and angle irons, with pipes being the most commonly used. Typically, one end of a bracing pipe is attached to the load utilizing, for example, a clamp or a bracket. The other end of the bracing pipe is connected to the ceiling or a beam. The manner in which this connection is made to the ceiling or beam and the components used are important in determining not only the load-carrying capacity of the brace but also influence the time and labor expended in installing the brace.

There are many types of sway brace fittings and related components in the prior art. One commonly used sway brace fitting has female threads which engage one end of a correspondingly sized, threaded bracing pipe. Such a design limits the use of the fitting with threaded pipes only and can also restrict its load-carrying capability. Additionally, the use of a threaded pipe, as compared to using a similar unthreaded pipe, undesirably adds to the cost of the sway brace system.

Another popular sway brace fitting employs a nut-bolt combination to secure the bracing pipe. This involves drilling a hole through the bracing pipe prior to installation. The bolt traverses the fitting and the bracing pipe and is secured in place by the nut. Disadvantageously, the labor and/or time consumed by such an installation is an undesirable additional expense.

Other sway brace fittings use a set screw which perpendicularly engages the wall of a bracing pipe and, thereby frictionally retains the bracing pipe. Some of these fittings may alternatively employ set screws with a cone point which perpendicularly digs into the bracing pipe wall for additional load-carrying capacity.

While some of the above-mentioned prior art sway brace fittings may be attachable to braces other than a bracing pipe, such as angle irons or channels, this attachment would generally require the use of an additional structural attachment component, thereby undesirably adding to the complexity and cost of the sway brace system and its installation.

Thus, there is a need for a versatile sway brace fitting which can not only withstand substantial loads, but is also attachable to a variety of bracing members, is simply and expeditiously installable, is economical to manufacture and, hence, is desirably inexpensive.

SUMMARY OF THE INVENTION

A sway brace fitting constructed in accordance with the present invention overcomes the afore-noted disadvantages by incorporating a pair of spaced jaws which can accommodate a variety of braces, along with a set screw, preferably having a cone point and preferably being angled, for securely and deformingly engaging the brace wall. Additionally, a yoke is incorporated with the sway brace fitting which facilitates attachment of the fitting to the desired surface.

The sway brace fitting is part of a bracing system used to prevent swaying of pipes and other loads suspended below ceilings and beams. The fitting firmly grips one end of the brace while the other end of the brace is connected to the load. The yoke is used to attach the sway brace fitting to the ceiling or beam.

In the preferred embodiment of the present invention, the sway brace fitting comprises a clamp center plate, a clamp collar plate, a set screw, and a connector pin. The clamp center plate includes a first jaw having a recess for receiving deformed material of the brace wall caused by forcible engagement of the brace wall with the set screw. The clamp center plate further includes a slot for receiving the clamp collar plate and for spacing and aligning the jaws to receive an end of a brace. A support, which is preferably incorporated into the center plate, is disposed adjacent to and above the center plate jaw and extends partially over the center plate first jaw.

Preferably, the clamp collar plate includes a pair of legs spaced by a slot having a closed end and an open end, and a second jaw with a threaded opening positioned substantially adjacent to the closed end of the collar plate slot. The collar plate legs are substantially U-shaped proximate to the open end and are aligned with a hole at one end of the center plate to receive a connector pin which couples the collar plate and the center plate.

The set screw preferably engages the collar plate threaded opening such that it is disposed substantially in line with the recess of the center plate and is threadably movable in the opening. The first jaw recess preferably has a sharp corner which engages the deformed material of the brace wall to resist withdrawal of the brace from between the jaws. Preferably, the threaded opening is angled, which in turn angles the set screw when it is engaged in the threaded opening. The angle orientation is such that when a tensile load is applied to the brace, the set screw is forced more tightly into the brace wall. Additionally, the center plate preferably has an edge positioned closely adjacent to the set screw which prevents movement of the set screw when a compressive load is applied to the brace. Moreover, the center plate support resists bending of the collar plate second jaw and advantageously orients a substantial portion of the applied load parallel to the plane of the center plate. Preferably, the set screw has a cone point for firmly lodging in to the wall of the brace, thereby securely clamping the brace against the center plate first jaw.

The sway brace fitting of the present invention may be manufactured by machining, casting or forging, but a preferred method of manufacturing the sway brace fitting includes stamping flat strips of metal into the desired shapes. A first strip of metal is stamped into a generally rectangular shaped plate. The stamping includes punching an opening through one end of the plate, and punching a slot in an opposite end of the plate to create a pair of spaced legs such that the slot has a closed end which is spaced from but aligned with the opening. The opening is threaded and the free ends of the legs are bent into a generally U-shape to form a clamp collar plate.

A second strip of metal is stamped into a clamp center plate. The stamping includes punching a hole at one end of the center plate while the other end is formed into a jaw which has a slot adjacent to it. The closed end of the collar plate slot is inserted into the slot in the center plate so that the hole in the center plate is aligned with the U-shaped ends of the legs of the collar plate and the closed end of the slot in the collar plate fits within the slot formed in the center plate. A set screw is then threaded into the threaded opening of the collar plate, and a connector pin may optionally be inserted into the hole of the center plate, to form a sway brace fitting including the center plate, the collar plate and the set screw. This preferred method for manufacturing the fitting is especially suited for automated assembly lines, wherein the simplicity and speed of the manufacturing process produces a desirably inexpensive end-product.

In accordance with one embodiment, a sway brace attachment is provided. The sway brace attachment generally comprises a first jaw, a second jaw and a screw. The second jaw is spaced from the first jaw and is rigidly connected to the first jaw. The second jaw has a threaded opening. The screw is mounted in the threaded opening and movable towards the first jaw to clamp a brace between the jaws. A recess is formed on the first jaw and is adapted to receive deformed material of the brace displaced by the screw forcibly engaging the brace. The recess has a center substantially aligned with the screw.

In accordance with another embodiment, a sway brace fitting is provided. The sway brace fitting generally comprises a clamp with a body portion, a lower jaw and a screw. The lower jaw is on the body portion of the clamp. The lower jaw has an inner surface with a length. The screw has a threaded portion and is threadably mounted on the clamp. The screw is movable towards the inner surface of the lower jaw to grip a wall of a brace between the lower jaw and the screw. A recess on the inner surface of the lower jaw provides clearance space for deformed material created by the screw engaging the brace. The recess has a length smaller than the length of the inner surface of the lower jaw.

In accordance with yet another embodiment, a seismic fitting is provided for connection to a support element. The fitting generally comprises a first jaw, a second jaw and a screw. The first jaw has a length. The second jaw is spaced from the first jaw and mechanically connected to the first jaw. The screw is threadably mounted on the second jaw and movable towards the first jaw to clamp a portion of the support element between the jaws. The first jaw has a recess with a closed face generally defining the depth of the recess. The recess is substantially aligned with the screw and has a length less than the length of the first jaw.

In accordance with still another embodiment, a sway brace assembly is provided for connection to a brace for supporting a load against sway and/or seismic disturbances. The sway brace assembly generally comprises a clamp of rigid material and a member attached to the clamp for connecting the clamp to a support surface. The clamp generally comprises a jaw and a screw. The jaw on the clamp has a length. The screw is threadably mounted on the clamp and movable towards the jaw to grip the brace between the jaw and the screw. The clamp further comprises a recess on the jaw for receiving deformed material caused by the screw forcibly engaging the brace. The recess has a length less than the length of the jaw.

In accordance with a further embodiment, a sway brace system is provided. The sway brace system generally comprises a brace and a clamp of rigid material. The brace generally comprises a jaw engaged with a wall of the brace and a screw having an end deformingly engaged with the wall of the brace. The jaw and the screw are on opposed sides of the brace wall. The jaw includes a recess formed on an inner surface of the jaw. The recess contains deformed material of the brace caused by the engagement between the screw and the brace.

In accordance with another further embodiment, a method of securely attaching a sway brace to a clamp is provided. The clamp generally comprises a jaw and a screw threadably movable towards the jaw. The jaw of the clamp is positioned adjacent a wall of the brace. An end of the screw of the clamp is positioned adjacent the wall of the brace such that the screw and the jaw are on opposed sides of the wall. The screw is rotated to engage the wall of the brace. The wall of the brace is gripped between the screw and the jaw with sufficient force to deform a portion of the wall into a recess formed on an inner surface of the jaw.

In accordance with yet another further embodiment, a sway brace attachment is provided. The sway brace attachment generally comprises a lower jaw, an upper jaw and a screw. The upper jaw is spaced from the lower jaw to form a gap therebetween and is rigidly connected to the lower jaw. The screw is threadably mounted on the upper jaw and is movable towards the lower jaw to clamp a portion of a brace between the lower jaw and the screw. The lower jaw comprises a recess. The recess is configured to receive deformed material of the brace displaced by the screw forcibly engaging the brace.

Those of ordinary skill in the art will readily recognize the versatility of the present invention. The jaws of the sway brace fitting of the present invention are attachable to a variety of braces, for example, bracing pipes, angle irons, channels, plates and the like. Additionally, the fitting described herein can reliably withstand substantial loads, is simply and expeditiously installable, is economical to manufacture and is desirably inexpensive.

Other specific provisions and advantages of the present invention will become apparent from a reading and study of the specification, claims and figures. As will be realized by those skilled in the art the invention is capable of modifications in various respects, all without departing from the scope and utility of the invention as disclosed herein. Accordingly the specification and figures should be regarded as illustrative in nature, and not as restrictive.

DETAILED DESCRIPTION OF THE PREFERRED EMBODIMENT

Figure 1:
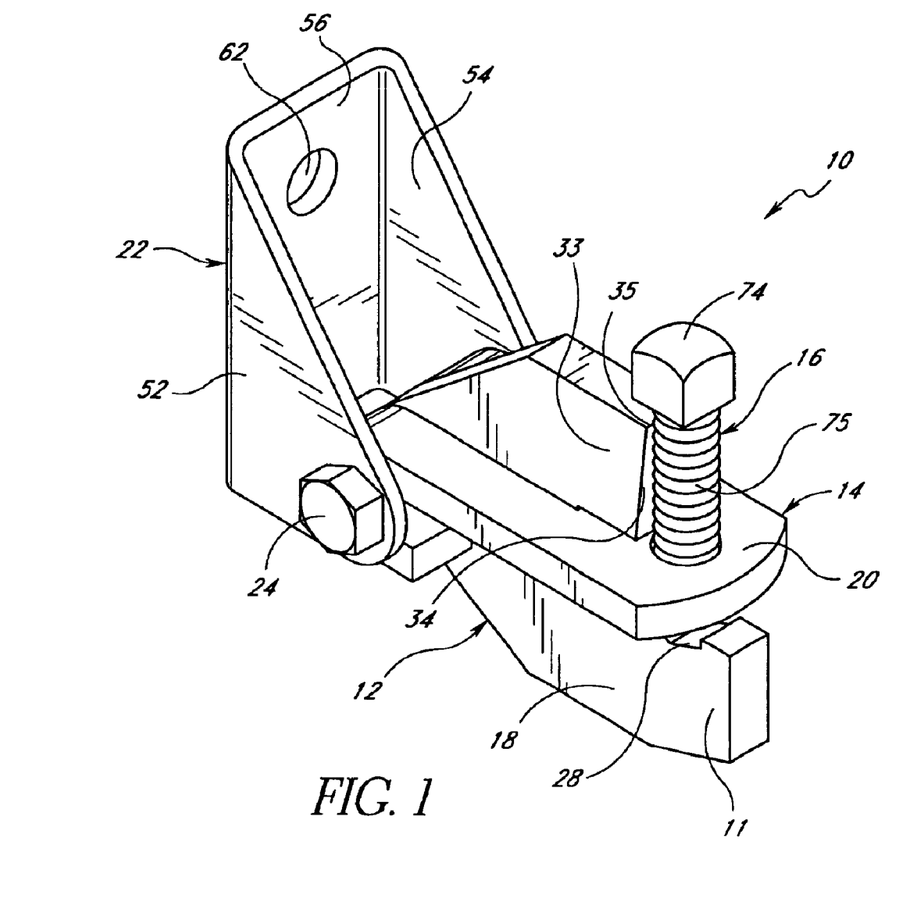
FIG. 1 is a perspective view of a preferred embodiment of a sway brace fitting constructed in accordance with the teachings of the present invention.
Figure 2:
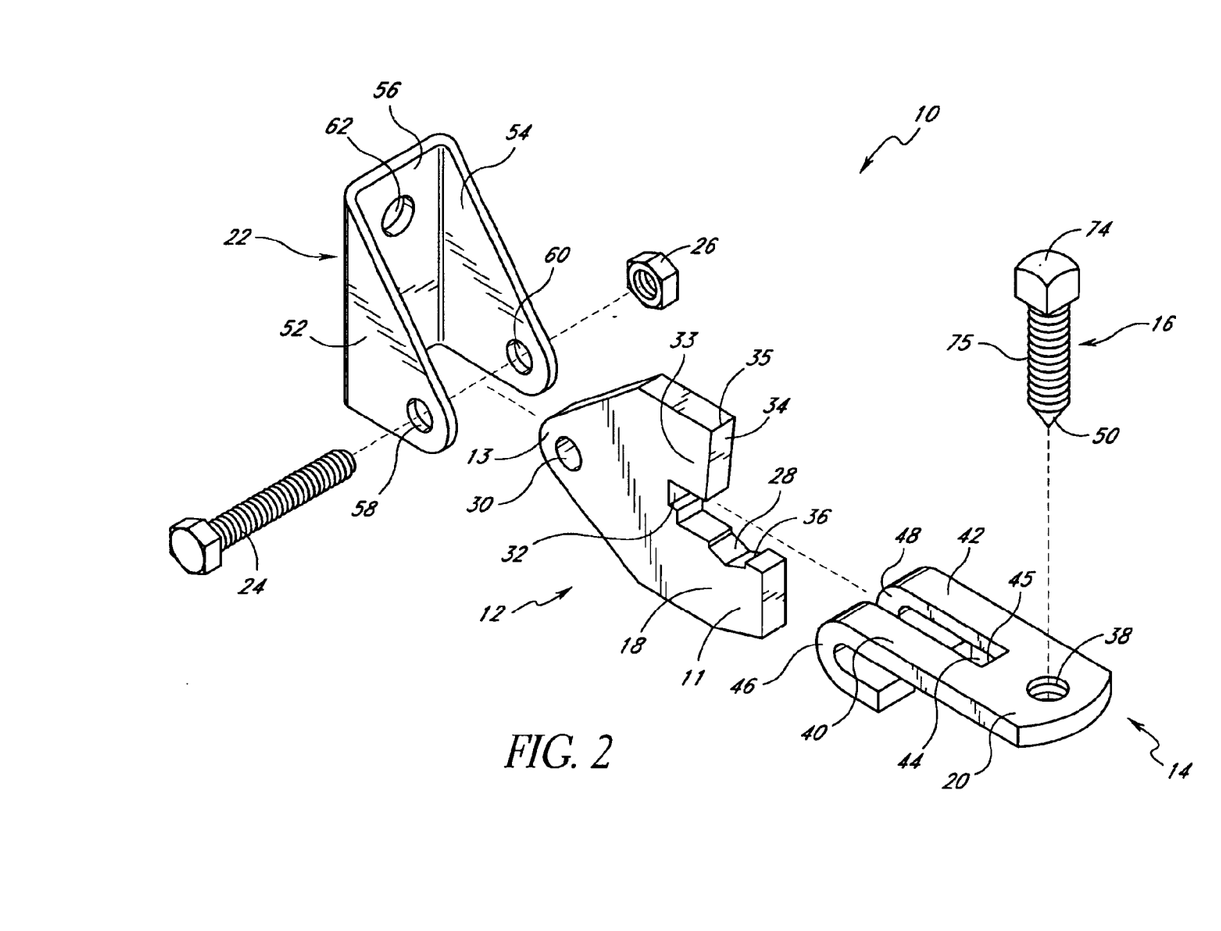
FIG. 2 is an exploded perspective view of the sway brace fitting of FIG. 1.
Figure 3:
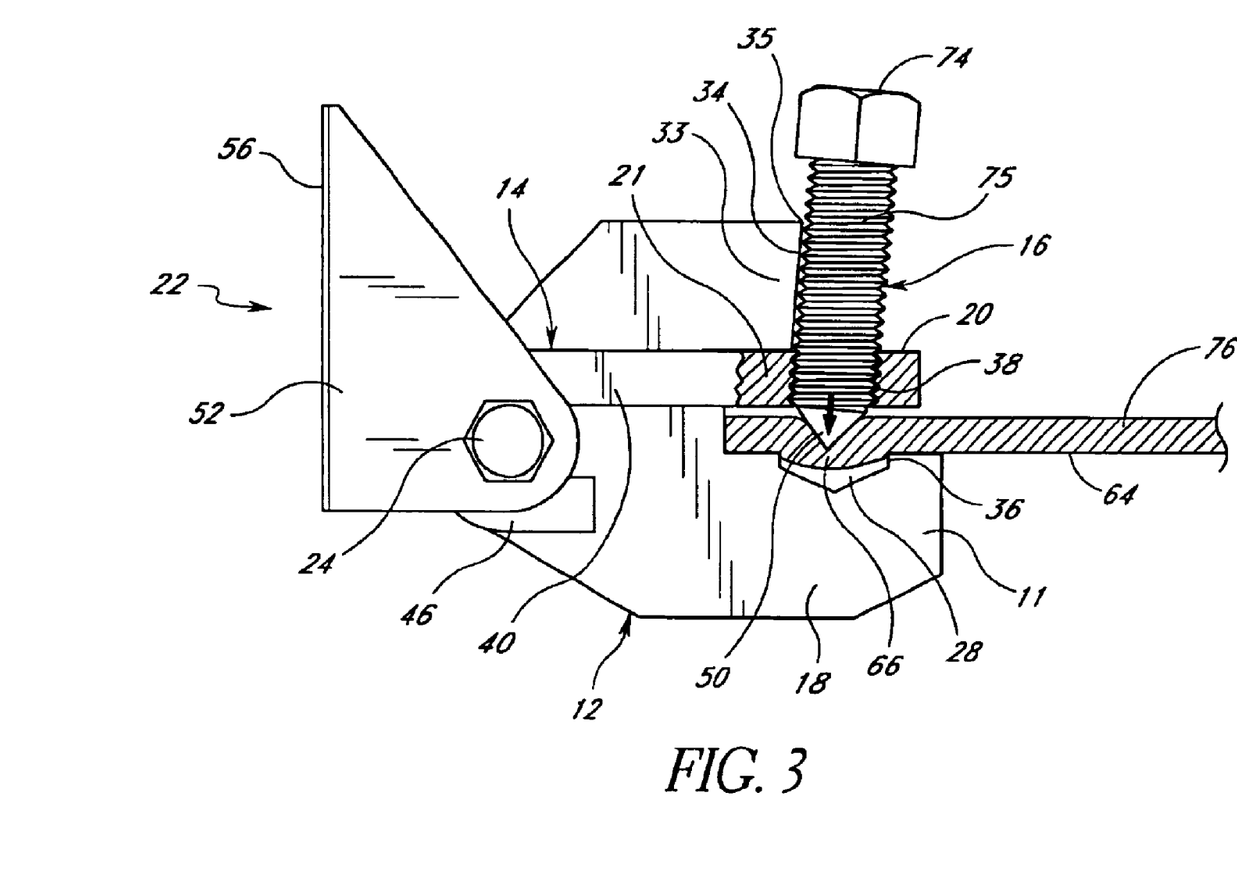
FIG. 3 is a partially sectional side view of the sway brace fitting of FIG. 1 illustrating the deformable gripping of the brace wall.

Referring to the drawings, and particularly to FIGS. 1 to 3, a preferred embodiment of a sway brace fitting 10 constructed and assembled in accordance with the invention comprises a clamp center plate 12, a clamp collar plate 14, a set screw 16, a bolt 24 and a nut 26. The fitting 10 securely and deformingly grips a brace wall 64 of a brace 76. Additionally, a yoke 22 is incorporated with the sway brace fitting 10 of the present invention.

Figure 4A:
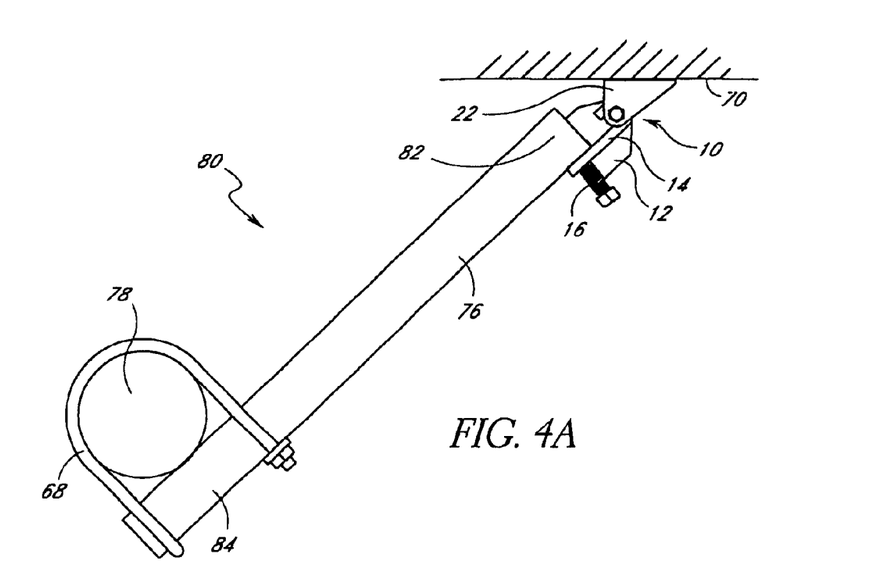
FIG. 4A is a schematic illustration of the sway brace fitting of FIG. 1 mounted to a substantially horizontal surface.
Figure 4B:
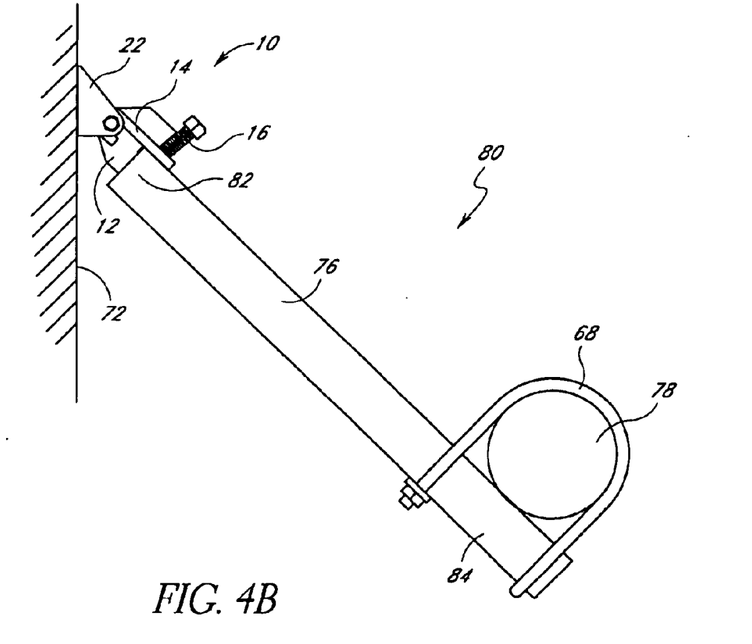
FIG. 4B is a schematic illustration of the sway brace fitting of FIG. 1 mounted to a substantially vertical surface.

As schematically illustrated in FIGS. 4A and 4B, the sway brace fitting 10 is part of a bracing system 80 used to prevent swaying of pipes and other loads, for example a pipe 76, suspended from ceilings and beams. The fitting 10 firmly grips one end 82 of the brace 76 while the other end 84 of the brace 76 is connected to the load, for example the pipe 76. The yoke 22 is used to attach the sway brace fitting 10 to the ceiling or beam.

Figure 6:
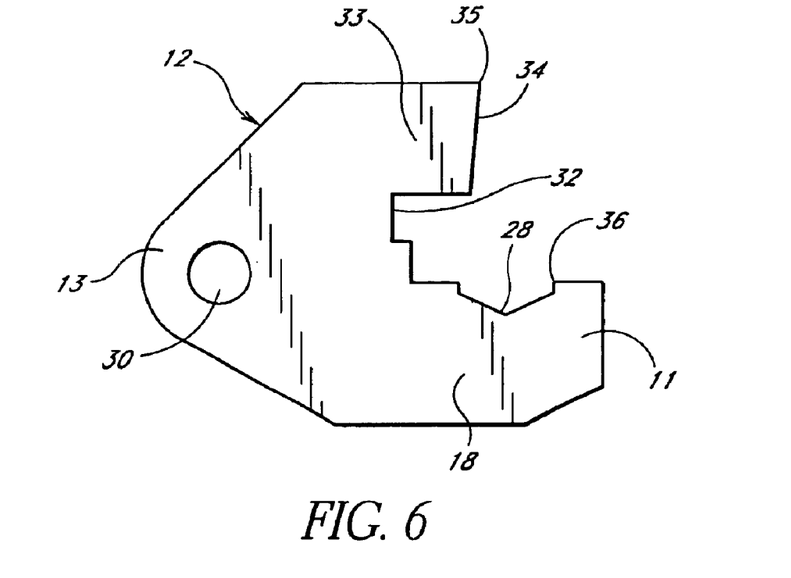
FIG. 6 illustrates a preferred step during manufacture of the center plate of the sway brace fitting of FIG. 1.

As best shown in FIGS. 2 and 6, preferably, one end 11 of the clamp center plate 12 includes a first jaw 18 while the other end 13 has a hole 30. The inner edge of the jaw 18 has a recess 28, including a sharp corner 36, for receiving deformed material 66 (see FIG. 3) from the brace 76. The center plate 12 further includes a slot 32 for receiving the collar plate 14 and an edge 34 which is located above the rear of the first jaw 18. Preferably, a top corner 35 of the edge 34 protrudes towards the end 11 so that the face of the edge 34 is protrudingly angled with respect to the vertical axis of the center plate 12, as best seen in FIG. 3. A support 33 is preferably included in the center plate 12 and is situated adjacent to and above the slot 32 and extends partially over the first jaw 18.

In the preferred embodiment, the clamp collar plate 14 (FIGS. 1 to 3, and 7) includes a pair of legs 40 and 42 spaced by a slot 44 having a closed end 45 and an open end 47 (shown in FIG. 7), and a second jaw 20 with a threaded opening 38 positioned spaced from but close to the closed end 45 of the slot 44. Preferably, the threaded opening 38 is angled so that its longitudinal axis of symmetry is substantially parallel to the edge 34. The collar plate legs 40 and 42 have substantially U-shaped portions 46 and 48, respectively, proximate to the open end of the slot 44. The engagement between the slot 32 of the center plate 12 and the slot 44 of the collar plate 14 spaces and aligns the first jaw 18 and the second jaw 20 for receiving the brace wall 64, and also disposes the threaded opening 38 in substantial alignment with the recess 28. Also, part 21 (see FIG. 3) of the second jaw 20 adjacent to the closed end 45 of the collar plate slot 44 is preferably disposed below and adjacent to the support 33 of the center plate 12. Moreover, when the collar plate 14 is in engagement with the center plate 12, the U-shaped portions 46 and 48 of the collar plate legs 40 and 42, respectively, partially substantially circumscribe respective ends of the center piece hole 30. This allows the bolt 24 to couple the center plate 12 and the collar plate 14 by traversing the U-shaped portions 46 and 48 and the hole 30. The collar plate 14 preferably has a thickness which ensures a substantially comfortable fit into the slot 32 of the center plate 12. Moreover, preferably the slot 44 of the collar plate 14 is so dimensioned that it can comfortably accommodate the thickness of the center plate 12.

Preferably, the center plate 12 and the collar plate 14 are fabricated from hot-rolled low-carbon steel to meet the standards set by the Underwriters Laboratories (U.L.), Factory Mutual Engineering (F.M.), and other such quality control groups. Additionally, the center plate 12 and the collar plate 14 may have a plain or electro-galvanized finish.

The set screw 16 (FIGS. 1 to 3) is threadably movably disposed in the threaded opening 38 of the collar plate. As a result of the opening 38 preferably being angled, the set screw 16 is preferably angled as well and in addition is preferably disposed substantially parallely adjacent to the angled edge 34 of the center plate 12. Moreover, the set screw 16 and its longitudinal axis are substantially aligned with the recess 28 since the threaded opening 38 is in substantial alignment with the recess 28. Preferably, the set screw 16 includes a head 74, a threaded portion 75, and a cone point 50 for firmly lodging in to the brace wall 64. The set screw 16 is preferably fabricated from a hardened carbon steel.

The yoke 22 (FIGS. 1 to 3) includes a pair of opposing side walls 52, 54 which entertain holes 58, 60, respectively, and an end wall 56 with a hole 62. The side walls 58, 60 are positioned over the U-shaped portions 46, 48 of the legs 40, 42, respectively, of the collar plate 14 such that the bolt 24 traverses the yoke side wall holes 58, 60, the U-shaped portions 46, 48 and the center plate hole 30, thereby securing the center plate 12 and the collar plate 14 to one another and to the yoke 22. The hole 62 of the end wall 56 facilitates coupling of the yoke 22, and hence, the sway brace fitting 10, to an attachment component (not shown) affixed to a beam or ceiling.

Preferably, the center plate 12 is about 0.375 inches thick, and has a maximum end-to-end length of about 3 inches and a maximum height of about 2.25 inches. Preferably, the collar plate 14 is about 0.312 inches thick, and has a maximum end-to-end length of about 3 inches, a width of about 1.5 inches and a maximum height of about 1.030 inches. The distance between the opposing faces of the center plate slot 32 is about 0.318 inches which ensures a substantially comfortable fit with the approximately 0.312 inches thick collar plate 14. The width of the collar plate slot 44 is about 0.385 inches, thus permitting a substantially comfortable mating between the approximately 0.375 inches thick center plate 12 and the collar plate 14. Preferably, the spacing between the first jaw 18 and the second jaw 20 is about 0.25 inches.

The maximum depth of the recess 28 of the center plate 12 is preferably about 0.218 inches which is generally more than sufficient to accommodate the deformed material 66 (see FIG. 3). The recess 28 has a top open face and a bottom closed face with the open face having a perimeter size about the same as or slightly larger than the circumferential size of the threaded portion 75 of the set screw 16. Preferably, the edge 34 of the center plate 12 is angled at about 5° with respect to the vertical axis of the center plate 12, as best seen in FIGS. 3 and 6. Preferably, the threaded opening 38 of the collar plate 14 is angled at about 5° so that its longitudinal axis of symmetry is substantially parallel to the edge 34. As a result of the opening 38 preferably being angled at 5°, the set screw 16 is preferably angled at 5° as well and, hence is preferably disposed substantially parallely adjacent to the angled edge 34 of the center plate 12. Preferably, the threaded portion 75 of the set screw 16 is about 1.25 inches long and comprises of standard ½-inch threads. Of course, those skilled in the art will recognize that these and other dimensions presented herein are descriptive of a preferred embodiment, and that the present invention may be alternatively dimensioned with efficacy.

In use, the brace 76 is inserted between the first jaw 18 and the second jaw 20 of the sway brace fitting 10, as best illustrated in FIG. 3. The spacing between the jaws 18 and 20 permits insertion of braces with various wall thicknesses, though it is preferred that the thickness of the brace 64 be about 25% to 75% of the jaw spacing. A torquing wrench (not shown) is used to tighten the set screw 16 against the brace wall 64 until the screw head 74 breaks off. This forcible engagement of the brace wall 64 with the set screw cone point 50 causes deformation of the brace wall 64 and results in the recess 28 receiving brace wall deformed material 66, thereby securely clamping the brace 76 against the center plate first jaw 18.

Advantageously, the sharp corner 36 (see FIG. 3) of the recess 28 engages the deformed material 66 of the brace wall 64 to resist withdrawal of the brace 76 from between the jaws 18 and 20. Hence, the incorporation of the recess sharp corner 36 provides supplementary means for ensuring that the brace 76 remains firmly lodged in place.

Referring again to FIG. 3, the angled threaded hole 38 and the subsequent angling of the set screw 16 result in the set screw 16 being inclined towards the mouth of the first jaw 18 and second jaw 20. Advantageously, this ensures that when a tensile load is applied to the brace 76 the set screw 16 is forced more tightly into the brace wall 64, thereby effectively enhancing the gripping power of the sway brace fitting 10. Additionally, when a compressive load is applied to the brace 76 the center plate angled edge 34 which is positioned proximate to the set screw 16 obstructs possible movement of the set screw 16 and, hence, prevents possible bending and/or buckling of the second jaw 20, thereby permitting the sway brace fitting 10 to be reliably used at higher loading.

Referring to FIGS. 1 to 3, 6, and 7, the simple manner in which the center plate 12 and the collar plate 14 fit with one another contributes to a desirable feature of the sway brace fitting 10, partially due to the center plate support 33. A substantial portion of the load applied perpendicular to the plane of the second jaw 20 of the collar plate 14 is supported by the center plate support 33. Advantageously, this load is favorably oriented parallel to the plane of the support 33, and thereby the center plate 12, which effectively improves the strength of the sway brace fitting 10 and allows it to withstand higher loads. Additionally, the support 33 provides a strong physical barrier which resists bending of the second jaw 20 of the collar plate 14.

Therefore, the incorporation of the sharp corner 36 in the recess 28 of the center plate first jaw 18, the preferably angled threaded opening 38 in the collar plate second jaw 20, the edge 34 of the center plate first jaw 18, and the support 33 of the center plate 12 each contribute not only to enhancing the load-carrying capacity of the sway brace fitting 10, but also provide a built-in safety redundancy which adds extra degrees of security and reliability in use of the sway brace fitting 10. The preferred embodiment of the fitting 10 illustrated herein can safely withstand loads of over about 5000 pounds.

FIGS. 4A and 4B schematically illustrate the mounting of the sway brace fitting 10 and the manner in which it may be used to brace a load such as, for example, a pipe 78, against sway and seismic disturbances. Of course, the sway brace fitting 10 can alternatively be used for bracing other loads such as ducts, sprinkler systems, fans, air-conditioners, heaters, among others. The pipe 78 is fastened to the brace 76 by using, for example, a clamp 68, though other types of fastening devices may be used with efficacy. FIG. 4A illustrates the sway brace fitting 10 mounted on a horizontal surface 70, such as that of a beam or a ceiling, via an attachment member (not shown) which is engaged with the yoke 22. Alternatively, as illustrated in FIG. 4B the fitting 10 may be mounted to a vertical surface 72, such as that of a beam or a wall.

The brace 76 shown in FIGS. 3, 4A and 4B can be a bracing pipe, an angle iron or a channel which has a wall 64 gripped by the sway brace fitting 10. Additionally, as shown in FIG. 3, the brace 76 may be a plate with a wall 64 lodged in the fitting 10. This exemplifies the versatility of the sway brace fitting of the present invention wherein it is adaptable to various types of braces. In contrast, conventional sway brace fittings are typically restricted to a single type of brace and would need additional attachment components for accommodating different types of braces, thereby adding to the cost and complexity of the sway brace system and to its installation.

Figure 7:
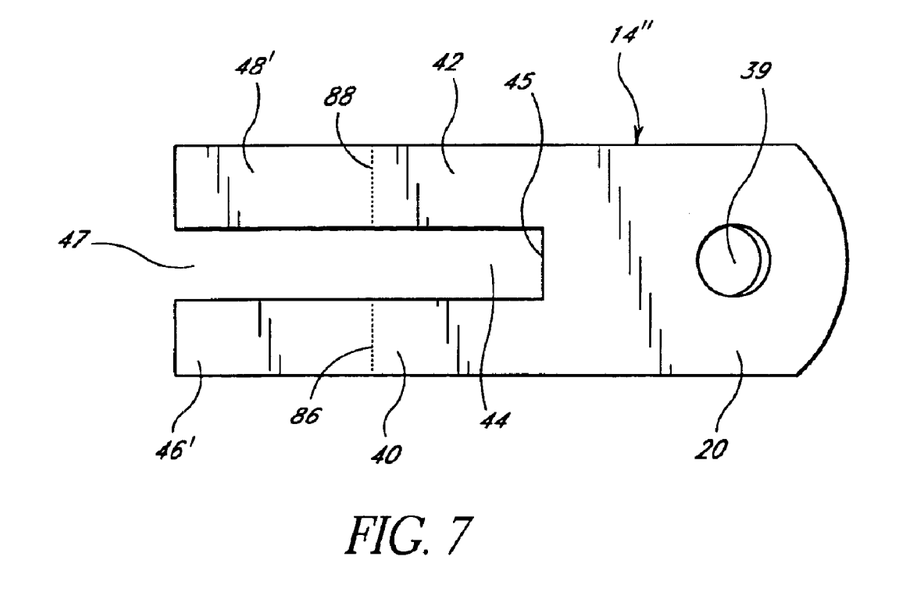
FIG. 7 illustrates a preferred step during manufacture of the collar plate of the sway brace fitting of FIG. 1.

The sway brace fitting 10 of the present invention may be manufactured by casting or machining, but a preferred method of manufacturing the sway brace fitting 10 includes stamping flat strips of metal into the desired shapes (see FIGS. 6 and 7). Referring to FIG. 7, a first strip of metal is stamped into a generally rectangular shaped plate 14". The stamping includes punching an opening 39, preferably angled, through one end of the plate, and punching an elongated slot 44 in an opposite end of the plate to create a pair of spaced legs 40 and 42 such that the slot 44 has a closed end 45 which is spaced from but aligned with the opening 39. The opening 39 is threaded to form a threaded opening 38 (see, for example, FIG. 2). The free ends 46' and 48' of the legs 40 and 42, respectively, are bent along the lines marked 86 and 88 (shown in FIG. 7), respectively, into a pair of generally U-shaped portions 46 and 48 to form a clamp collar plate 14 (see, for example, FIG. 2).

Referring to FIG. 6, a second strip of metal is stamped into a clamp center plate 12. The stamping includes punching a hole 30 at one end 13 of the plate 12 while the other end 11 is formed into a first jaw 18 and a support 33 for the collar plate second jaw 20. The first jaw 18 has a recess 28 which in turn has a sharp corner 36, the first jaw 18 having a slot 32 adjacent to it. The closed end 45 of the collar plate slot 44 (FIGS. 2 and 7) is inserted into the slot 32 of the center plate 12 so that the hole 30 in the center plate 12 is aligned with the U-shaped ends 46 and 48 of the legs 40 and 42 of the collar plate 14. Of course, alternatively, the center plate 12 can be inserted into the slot 44 in the collar plate 14 (FIGS. 2 and 7) so that the hole 30 in the center plate 12 is aligned with the U-shaped ends 46 and 48 of the legs 40 and 42 of the collar plate 14 and the closed end of the slot 44 in the collar plate 12 fits within the slot 32 formed in the center plate. The set screw 16 (FIGS. 1 and 2) is then threaded into the threaded opening 38 of the collar plate 12 so that it is positioned adjacent to the center plate edge 34, and optionally the bolt 24 may be inserted into the hole 30 of the center plate 12 and the nut 26 threaded on to the bolt 24, to form the sway brace fitting 10. With the bolt 24 so positioned the plates 12 and 14 are then interlocked so that the jaws 18 and 20 are spaced to receive a brace.

The above-described method is especially suited for automated assembly lines, wherein stamping, punching and bending operations can be efficiently executed. The simplicity and speed of this manufacturing method results in an end-product that is economical to manufacture and, thus is desirably inexpensive. Of course, alternatively, the components of the sway brace fitting may be machined but this process is more time consuming and, consequently, more expensive.

Figure 5:
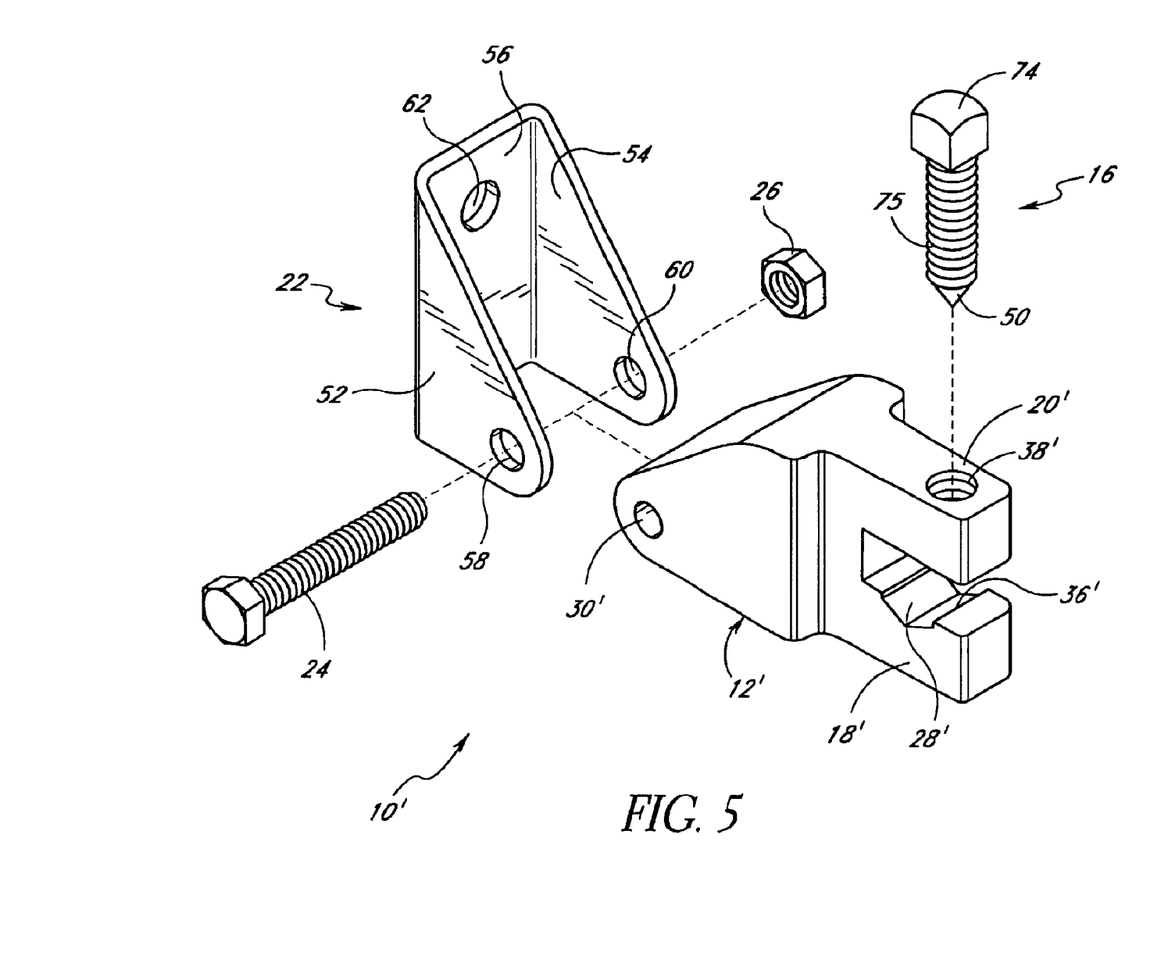
FIG. 5 is an exploded perspective view of an alternative embodiment of a sway brace fitting constructed in accordance with the teachings of the present invention.

In an alternative embodiment of the invention shown in FIG. 5 a sway brace fitting 10' includes a clamp 12' which is casted as a single piece. The clamp 12' essentially unifies the clamp center plate 12 and the clamp collar plate 14 (see FIGS. 1 to 3). The casted clamp 12' is substantially cannon-shaped, but is functionally substantially equivalent to the combination of the center plate 12 and the collar plate 14 of the fitting 10 as described hereinabove and shown, for example, in FIGS. 1 to 3. The clamp 12' comprises a first jaw 18' with a recess 28' which in turn includes a sharp corner 36', a second jaw 20' with a threaded opening 38', preferably angled, and a hole 30' for receiving the bolt 24 (see FIGS. 1 and 2). Since the relevant structure and operation of the sway brace fitting 10' are substantially the same as that of the fitting 10 (FIGS. 1 to 4), they will not be repeated here. In FIG. 5, like numerals refer to like members as characterized in FIGS. 1 to 4.

The utility and versatility of the present invention will be readily apparent to those skilled in the art. The sway brace fitting of this invention can not only withstand substantial loads, but is also adaptable to a variety of braces, is simply and expeditiously installable, is economical to manufacture and, hence, desirably inexpensive.

While the components and method of the present invention have been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the full range of equivalency to which each element thereof is entitled.

What is claimed is:

1. A method of securely attaching a sway brace to a clamp comprising a jaw and a screw threadably movable towards said jaw, comprising the steps of:
    positioning said jaw of said clamp adjacent a wall of said brace;
    positioning an end of said screw of said clamp adjacent said wall of said brace such that said screw and said jaw are on opposed sides of said wall;
    rotating said screw to engage said wall of said brace such that said end of said screw forcibly contacts said wall of said brace;
    gripping said wall of said brace between said screw and said jaw with sufficient force to deform a portion of said wall into a recess formed on an inner surface of said jaw, wherein said clamp is connected to a first end of said brace; and
    connecting a second end of said brace to a load so that said load is suspended from a support.

2. The method of claim 1, further including a step of pivotally connecting said clamp to said support.

3. The method of claim 1, further including a step of pivotally connecting said clamp to a connection member.

4. The method of claim 3, further including a step of attaching said connection member to said support.

5. The method of claim 4, wherein attaching said connection member comprises attaching said connection member to a substantially horizontal surface of said support.

6. The method of claim 4, wherein attaching said connection member comprises attaching said connection member to a substantially vertical surface of said support.

7. The method of claim 1, wherein connecting a second end of said brace comprises connecting the second end of said brace to the load using a fastening device.

8. The method of claim 7, wherein said method further comprises connecting said clamp to said support.

9. The method of claim 8, wherein connecting said clamp to said support comprises attaching a connection member to said clamp and said support.

10. A method of securely attaching a brace to a sway brace fitting for suspending a load from a structure, comprising:
    positioning said brace between a first jaw and a second jaw of said sway brace fitting such that said brace extends into a gap formed between said first jaw and said second jaw;
    threadably moving a set screw of said sway brace fitting towards said brace with said set screw being threadably engaged in an opening of said second jaw so that an end of said set screw contacts said brace and said brace abuts against said first jaw and is spaced from said second jaw;
    rotating a head ot said set screw so that said end of said set screw forcibly engages said brace at a point of contact to deform said brace at and around said point of contact on said brace;
    receiving deformed material of said brace into an unthreaded recess having a closed bottom face formed on said first jaw with said recess having a length less than that of said first jaw; and
    securely locking said deformed material in said brace by engagement of said brace with a forward corner of said recess thereby firmly lodging said brace in place within said sway brace fitting.

11. The method of claim 10, wherein said method comprises suspending said load which includes at least one of a pipe, a duct, a sprinkler, a fan, an air conditioner and a heater.

12. The method of claim 10, wherein rotating a head of set screw comprises rotating said head to tighten said set screw until said head breaks off.

13. The method of claim 10, wherein said method comprises deforming said brace at and around said point of contact by a hardened cone point at said and of said sot screw.

14. The method of claim 10, wherein said method comprises attaching said sway brace fitting and said brace which includes at least one of a pipe, an angle iron and a channel.

15. A method of connecting a first support to a sway brace attachment for supporting a load against sway and/or seismic disturbances, comprising:
    connecting said attachment to a member using a pin extending through a passage at a rear portion of said attachment;
    inserting said first support in said attachment so that said first support is adjacent a jaw of said attachment;
    threadably moving a screw of said attachment towards said jaw to grip said support between said jaw and said screw;
    tightening said screw such that a tooth, extending in a direction generally parallel to said screw and positioned on said jaw at a forward portion of said attachment so that said screw is located between said passage and said tooth, interlocks with said first support to firmly clamp said first support in said attachment;
    connecting, said member to a second support; and
    connecting said first support to said load such that said load is suspended from said second support and below said member.

16. The method of claim 15, wherein said method further comprises receiving deformed material of said first support created by forcible engagement of said screw arid said first support in a recessed portion on said jaw between said tooth and said passage.

17. The method of claim 15, wherein connecting said attachment to a member comprises pivotally connecting said attachment and said member.

* * * * *

UNITED STATES PATENT AND TRADEMARK OFFICE
CERTIFICATE OF CORRECTION

| | |
|---|---|
| PATENT NO. | : 6,953,174 B2 |
| APPLICATION NO. | : 10/287323 |
| DATED | : October 11, 2005 |
| INVENTOR(S) | : Richard W. Heath |

It is certified that error appears in the above-identified patent and that said Letters Patent is hereby corrected as shown below:

On Title page (56) page 2, column 1, line 7, please delete "Kozlarz" and insert --Koziarz--, therefor.

At column 1, line 3, please delete "APPLICATION" and insert --APPLICATIONS--, therefor.

At column 1, line 6, please delete "2001" and insert --2001,--, therefor.

At column 10, line 10, in Claim 10, please delete "ot" and insert --of--, therefor.

At column 10, line 32, in Claim 13, please delete "and" and insert --end--, therefor.

At column 10, line 32, in Claim 13, please delete "sot" and insert --set--, therefor.

At column 10, line 54, in Claim 15, please delete "connecting," and insert --connecting--, therefor.

At column 10, line 60, in Claim 16, please delete "arid" and insert --and--, therefor.

Signed and Sealed this

Fifth Day of June, 2007

JON W. DUDAS
*Director of the United States Patent and Trademark Office*